US011655717B2

United States Patent
Henderkott et al.

(10) Patent No.: US 11,655,717 B2
(45) Date of Patent: May 23, 2023

(54) TURBINE BLADE SQUEALER TIP INCLUDING INTERNAL SQUEALER TIP COOLING CHANNEL

(71) Applicant: Rolls-Royce Corporation, Indianapolis, IN (US)

(72) Inventors: Joseph Peter Henderkott, Westfield, IN (US); Corina Moga, Carmel, IN (US); John Alan Weaver, Indianapolis, IN (US); Michael Wood, Brownsburg, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 226 days.

(21) Appl. No.: 16/951,947

(22) Filed: Nov. 18, 2020

(65) Prior Publication Data

US 2021/0254476 A1 Aug. 19, 2021

Related U.S. Application Data

(62) Division of application No. 15/972,725, filed on May 7, 2018, now abandoned.

(51) Int. Cl.
*F01D 5/18* (2006.01)
*F01D 11/12* (2006.01)
(Continued)

(52) U.S. Cl.
CPC ............ *F01D 5/187* (2013.01); *B23K 1/0018* (2013.01); *F01D 11/122* (2013.01); *B23P 15/04* (2013.01);
(Continued)

(58) Field of Classification Search
CPC ........... F05D 2260/20; F05D 2260/202; F05D 2260/204; F05D 2230/30; F05D 2230/31;
(Continued)

(56) References Cited

U.S. PATENT DOCUMENTS 4,142,824 A 3/1979 Andersen
5,733,102 A 3/1998 Lee et al.
(Continued)

FOREIGN PATENT DOCUMENTS

DE 19944923 A1 3/2001
EP 2666967 A1 11/2013
(Continued)

OTHER PUBLICATIONS

Extended Search Report from counterpart European Application No. 19168196.4, dated Nov. 4, 2019, 12 pp.
(Continued)

*Primary Examiner* — Moshe Wilensky
(74) *Attorney, Agent, or Firm* — Shumaker & Sieffert, P.A.

(57) ABSTRACT

A gas turbine engine component may include an airfoil extending radially from a base to a blade tip, the airfoil including a pressure sidewall and a suction sidewall each extending between a leading edge and a trailing edge opposite the leading edge, an internal cooling circuit extending from the base to the blade tip; and a squealer tip. The squealer tip may include a first and a second squealer tip rail adjacent to the first squealer tip rail, and a squealer tip cap extending between the first and second squealer tip rails. The blade tip, the first and second squealer tip rails, and the squealer tip cap may define an internal squealer tip cooling channel. The blade tip may define a supply aperture that fluidly connect the internal cooling circuit and the internal squealer tip cooling channel.

20 Claims, 6 Drawing Sheets

(51) Int. Cl.
  *B23K 1/00* (2006.01)
  *B23P 15/04* (2006.01)

(52) U.S. Cl.
  CPC ...... *F05D 2220/32* (2013.01); *F05D 2230/10* (2013.01); *F05D 2230/237* (2013.01); *F05D 2260/20* (2013.01)

(58) Field of Classification Search
  CPC ............ F05D 2230/50; F05D 2230/10; F05D 2230/22; F05D 2230/237; F05D 2220/32; F01D 11/122; F01D 5/187; F01D 5/147; F01D 5/20; B23P 15/04; B23K 1/0018
  See application file for complete search history.

(56) References Cited

U.S. PATENT DOCUMENTS

| | | |
|---|---|---|
| 6,991,430 B2 | 1/2006 | Stec et al. |
| 8,113,779 B1 | 2/2012 | Liang |
| 8,113,787 B2 | 2/2012 | Barril et al. |
| 8,366,394 B1 | 2/2013 | Liang |
| 8,616,847 B2 | 12/2013 | Allen |
| 9,850,764 B2 | 12/2017 | Care et al. |
| 10,012,095 B2 | 7/2018 | Stratton et al. |
| 10,030,527 B2 | 7/2018 | Stratton et al. |
| 10,436,040 B2 | 10/2019 | Rhodes et al. |
| 2008/0317601 A1 | 12/2008 | Barril et al. |
| 2011/0255990 A1 | 10/2011 | Diamond et al. |
| 2014/0072448 A1 | 3/2014 | Prue et al. |
| 2014/0178207 A1 | 6/2014 | He et al. |
| 2016/0003066 A1 | 1/2016 | Stratton |
| 2017/0259462 A1 | 9/2017 | Kottilingam et al. |
| 2017/0260865 A1* | 9/2017 | Schloffer ............ B23K 15/0006 |
| 2017/0342842 A1* | 11/2017 | Gallier .................... F01D 5/282 |
| 2018/0311772 A1 | 11/2018 | Stratton et al. |
| 2019/0063250 A1 | 2/2019 | Shi et al. |
| 2019/0338650 A1 | 11/2019 | Henderkott et al. |

FOREIGN PATENT DOCUMENTS

| | | |
|---|---|---|
| EP | 2666968 A1 | 11/2013 |
| EP | 2746536 A1 | 6/2014 |
| EP | 3428397 A1 | 1/2019 |
| EP | 3428398 A1 | 1/2019 |
| WO | 2015/069411 A1 | 5/2015 |
| WO | 2018/132161 A2 | 7/2018 |
| WO | 2018/132161 A3 | 7/2018 |

OTHER PUBLICATIONS

Response to Extended Search Report from counterpart European Application No. 19168196.4, dated Nov. 4, 2019, and filed Jun. 4, 2020, 8 pp.

Prosecution History from U.S. Appl. No. 15/972,725 dated Apr. 8, 2020 through Aug. 18, 2020, 83 pgs.

Examination Report from counterpart European Application No. 19168196.4, dated May 20, 2021, 9 pp.

Response to Examination Report dated May 20, 2021, from counterpart European Application No. 19168196.4, filed Sep. 15, 2021, 48 pp.

* cited by examiner

TURBINE BLADE SQUEALER TIP INCLUDING INTERNAL SQUEALER TIP COOLING CHANNEL

This application is a divisional of U.S. application Ser. No. 15/972,725, filed May 7, 2018.

TECHNICAL FIELD

The present disclosure generally relates to gas turbine engines and the cooling aspects of blades and other components.

BACKGROUND

Hot section components of a gas turbine engine may be operated in high temperature environments that may approach or exceed the softening or melting points of the materials of the components. Such components may include airfoils including, for example, turbine blades or vanes which may have one or more surfaces exposed high temperature combustion or exhaust gases flowing across the surface of the component. Different techniques have been developed to assist with cooling of such components including, for example, application of a thermal barrier coating to the component, construction the component as single or dual walled structure, and passing of a cooling fluid, such as cooling air, across or through a portion of the component.

SUMMARY

In some examples, the disclosure describes a gas turbine engine component that includes an airfoil extending radially from a base to a blade tip. The airfoil may include a pressure sidewall and a suction sidewall each extending between a leading edge and a trailing edge opposite the leading edge, an internal cooling circuit extending from the base to the blade tip, and a squealer tip. The squealer tip may include a first squealer tip rail and a second squealer tip rail adjacent to the first squealer tip rail and a squealer tip cap extending between the first and second squealer tip rails. The blade tip, the first and second squealer tip rails, and the squealer tip cap may define an internal squealer tip cooling channel. The blade tip may define a supply aperture that fluidly connect the internal cooling circuit and the internal squealer tip cooling channel.

In some examples, the disclosure describes method of forming a gas turbine engine component that includes an airfoil extending radially from a base to a blade tip, the airfoil including a pressure sidewall and a suction sidewall each extending between a leading edge and a trailing edge opposite the leading edge, and an internal cooling circuit extending from the base to the blade tip. The method may include forming, on the blade tip, a first squealer tip rail and a second squealer tip rail adjacent to the first squealer tip rail. The method also may include forming a squealer tip cap extending between the first and second squealer tip rails. The blade tip, the first and second squealer tip rails, and the squealer tip cap may define an internal squealer tip cooling channel. The blade tip may define a supply aperture that fluidly connect the internal cooling circuit and the internal squealer tip cooling channel.

The details of one or more examples are set forth in the accompanying drawings and the description below. Other features, objects, and advantages will be apparent from the description and drawings, and from the claims.

DETAILED DESCRIPTION

The disclosure describes articles and techniques that include a gas turbine engine component having an airfoil including a squealer tip that includes an internal squealer tip cooling channel to improve thermal load protection of the squealer tip. Gas turbine engines are used to power aircraft, watercraft, power generators, and the like. Rotating gas turbine engine components such as compressor blades, turbine blades, and knife seal rings spin at high speeds. Many of these rotating components are mounted in close proximity to static components. To improve the efficiency of the gas turbine engine, rotating components may include abrasive surfaces configured to form a channel in an abradable portion of static components, or vice versa. For example, a gas turbine engine component may include an airfoil extending radially from a base to a blade tip. The blade tip may include a sheet or layer of material that defines a radially outer surface of the airfoil. The airfoil may include a pressure sidewall and a suction sidewall each extending between a leading edge and a trailing edge opposite the leading edge.

In accordance with examples of this disclosure, a squealer tip may be on the blade tip. The squealer tip includes a first squealer tip rail and a second squealer tip rail adjacent to the first squealer tip rail. The squealer tip also may include a squealer tip cap. The squealer tip cap may include or be coated with an abrasive coating configured to abrade a channel in an abradable portion of an adjacent static component, e.g., a turbine shroud, as discussed above. By forming a channel in an abradable portion of an adjacent static component, the squealer tip may reduce aerodynamic losses at the blade tip and improve efficiency of the turbine engine.

The squealer tip cap may extend between the first and second squealer tip rails such that the blade tip, the first and second squealer tip rails, and the squealer tip cap define an internal squealer tip cooling channel. The blade tip may define a supply aperture that fluidly connect the internal cooling circuit and the internal squealer tip cooling channel. In this way, the squealer tip may be internally cooled to reduce thermal loading on the squealer tip. This may reduce an amount of cooling fluid used to cool the squealer tip, e.g., compared to components in which cooling fluid is primarily exhausted from cooling holes formed near the blade tip and caused to flow externally over the squealer tip. Reducing the amount of cooling fluid exhausted from cooling holes formed near the blade tip and caused to flow externally over the squealer tip may also improve aerodynamic efficiency of the component and, ultimately, the gas turbine engine.

Figure 1A:
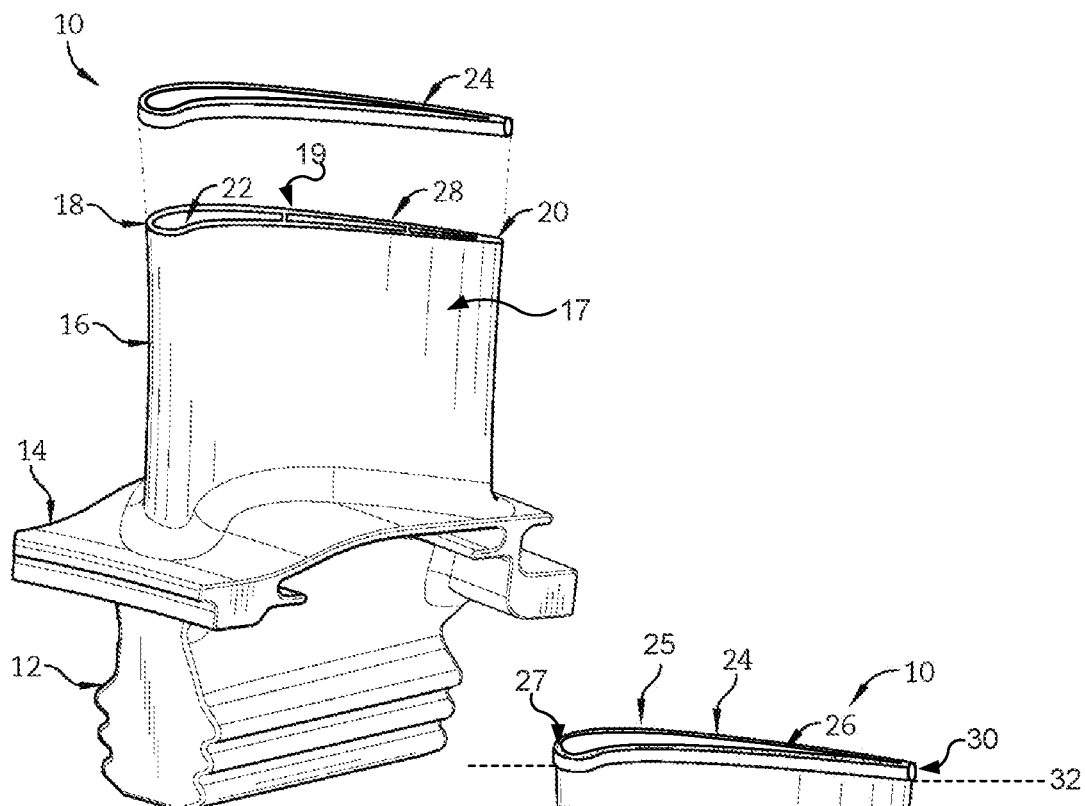
FIGS. 1A and 1B are conceptual and schematic diagrams illustrating an exploded perspective view and perspective view, respectively, of a gas turbine engine blade including a squealer tip that includes an internal squealer tip cooling channel.
Figure 1B:
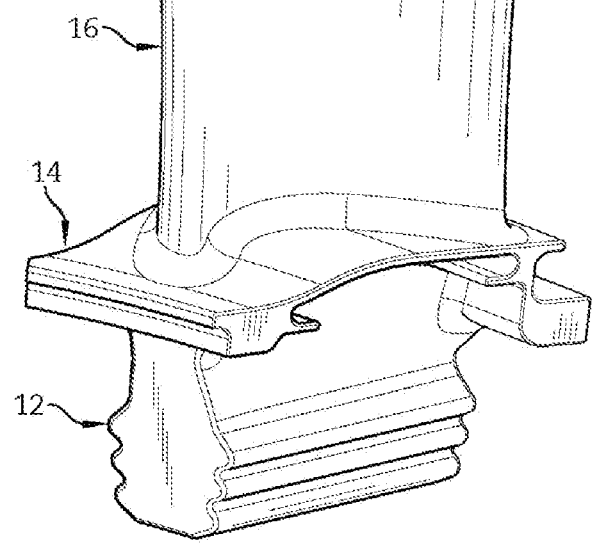

FIGS. 1A and 1B are conceptual and schematic diagrams illustrating an exploded perspective view and perspective view, respectively, of a gas turbine engine blade 10 including a squealer tip 24 that includes an internal squealer tip cooling channel. In some examples, blade 10 may include a root 12, a platform 14 (e.g., the blade base) coupled to the root 12, and an airfoil 16 coupled to the platform 14. In other examples, the gas turbine engine component may include a blisk that includes an integrally formed blade and disk. As illustrated in FIGS. 1A and 1B, platform 14 may connect root 12 to airfoil 16 and may separate root 12 from airfoil 16 to block gasses passing over airfoil 16 from moving down around root 12. Airfoil 16 may be aerodynamically shaped to interact with gasses moving over and around blade 10.

Airfoil 16 includes a pressure sidewall 17 and a suction sidewall 19 each extending between a leading edge 18 and a trailing edge 20 opposite leading edge 18. Leading edge 18 may be the point at the front of airfoil 16. Trailing edge 20 may be the point of at the rear of airfoil 16. Trailing edge 20 may have a smaller radius compared to leading edge 18 of airfoil 16. Leading edge 18, trailing edge 20, pressure sidewall 17, and suction sidewall 19 each extend from platform 14 to blade tip 28. The curvature of the surfaces defining leading edge 18, trailing edge 20, pressure sidewall 17, and suction sidewall 19 may vary to provide an aerodynamic shape. The thickness of leading edge 18, trailing edge 20, pressure sidewall 17, and suction sidewall 19 may be any suitable thickness.

Airfoil 16 includes an internal cooling circuit 22 (e.g., one or more cooling passages) arranged between leading edge 18 and trailing edge 20 and extending from platform 14 to blade tip 28. Internal cooling circuit 22 may be spaced apart between leading edge 18 and trailing edge 20 such that internal cooling circuit 22 allows a cooling fluid (e.g., cooling air) to flow through airfoil 16. In some examples, leading edge 18, trailing edge 20, pressure sidewall 17, and suction sidewall 19 may include a dual wall architecture in which pressure sidewall 17 and suction sidewall 19 are defined by an internal spar supporting external sheets. In examples in which airfoil 16 includes dual walls, the dual walls may define internal cooling circuit 22, e.g., in the space between the dual walls. The cooling fluid flow through internal cooling circuit 22 may help maintain the temperature of the blade 10 in the hot sections of a gas turbine engine below a predetermined threshold temperature.

Blade 10 includes a squealer tip 24. Squealer tip 24 includes a first squealer tip rail 25, a second squealer tip rail 26, and a squealer tip cap 27 extending between first squealer tip rail 25 and second squealer tip rail 26. In some examples, first squealer tip rail 25 (e.g., external squealer tip rail) extends from leading edge 18 to trailing edge 20 along pressure sidewall 17 and suction sidewall 19. In some examples, first squealer tip rail 25 may extend along pressure sidewall 17 and/or suction sidewall 19 less than the entire length of pressure sidewall 17 and/or suction sidewall 19, include a plurality of segments, or both. In some examples, second squealer tip rail 26 (e.g., internal squealer tip rail) extends from leading edge 18 to trailing edge 20 along pressure sidewall 17 and suction sidewall 19, internal relative to first squealer tip rail 25. In some examples, second squealer tip rail 26 may extend along pressure sidewall 17 and/or suction sidewall 19 less than the entire length of pressure sidewall 17 and/or suction sidewall 19, include a plurality of segments, or both. In some examples, first squealer tip rail 25 and second squealer tip rail 26 may be substantially parallel to each other. In other examples, first squealer tip rail 25 and second squealer tip rail 26 may converge or diverge at one or more positions along pressure sidewall 17, suction sidewall 19, or both. First squealer tip rail 25 may be substantially flush with or set back from pressure sidewall 17, suction sidewall 19, or both. The position of first squealer tip rail 25 relative to pressure sidewall 17 and suction sidewall 19 may affect the aerodynamics of blade 10 at blade tip 28.

Squealer tip 24 may be formed by any suitable manufacturing technique. For example, squealer tip 24 may be deposited on (e.g., by direct energy deposition), integrally formed with, brazed to, or welded to blade tip 28. In some examples, first squealer tip rail 25 and second squealer tip rail 26 may be integrally formed with blade tip 28 and joined to squealer tip cap 27. For example, first squealer tip rail 25 and second squealer tip rail 26 may be machined into blade tip 28 or deposited onto blade tip 28 (e.g., by direct energy deposition), whereas squealer tip cap 27 may be brazed or welded to first squealer tip rail 25 and second squealer tip rail 26. In some examples, first squealer tip rail 25 and second squealer tip rail 26 are integrally formed with squealer tip cap 27 and joined to blade tip 28. For example, a presintered preform defining first squealer tip rail 25, second squealer tip rail 26, and squealer tip cap 27 may be brazed to blade tip 28.

Squealer tip 24 may be made from one or more materials which may exhibit good high temperature strength, oxidation resistance, and/or resistance to wear. In some examples, squealer tip 24 may be a piece of sheet metal such as an alloy which may be cobalt-, nickel- or iron-based and may be alloyed with manganese, chromium, silicon, cobalt, tungsten, tantalum, aluminum, titanium, hafnium, rhenium, molybdenum, nickel, iron, boron, vanadium, carbon, yttrium, or the like. In some examples, squealer tip 24 may include a ceramic material or a ceramic matrix composite. For example, particles of an abrasive ceramic, such as cubic boron nitride, may be incorporated in a pre-sintered preform used to form squealer tip cap 27.

In some examples, squealer tip 24 (e.g., first squealer tip rail 25, second squealer tip rail 26, squealer tip cap 27, or a combination thereof) may include a braze material. The braze material may include a braze powder, a braze paste (e.g., powder carried by a solvent), or a braze preform (e.g., a rod, a ribbon, a wire, or the like). Generally, the braze material may include any suitable braze composition. Example braze materials may include a base metal, such as, for example, a nickel-based alloy or a cobalt-based alloy. In some examples, the braze material may include a metal in addition to the base metal, such as, for example, Al, Ti, Cr, W, Mo, Re, Ta, Si, B, or Fe. In some examples, the braze material may include a wide gap braze composition, which includes particles of a high temperature alloy mixed with a braze alloy comparable to the high temperature alloy constituents. For example, a wide gap braze composition may include a nickel-based braze mixed with particles of a nickel-based superalloy or a cobalt-based braze mixed with particles of a cobalt-based alloy. The braze material may be positioned using any of a variety of techniques, including, for example, spreading; dispensing with a syringe; positioning individual ribbons, wires, or rods; or the like. In examples in which the squealer tip 24 includes a braze preform, the braze preform may define a shape that substantially conforms to the shape of first squealer tip rail 25, second squealer tip rail 26, squealer tip cap 27, or a combination thereof. A braze preform may reduce shrinkage compared to a braze paste, and thus may improve a fit of the squealer tip 24 to blade tip 28. In some examples, after positioning braze material, the braze material may substantially conform to the shape of first squealer tip rail 25, second squealer tip rail 26, squealer tip cap 27, or a combination thereof, even if braze material does not include a braze preform.

Squealer tip 24 may generally be in the shape of the airfoil when viewed normal to a plane 32 defined by the squealer tip 24. In other example, squealer tip 24 may be define other shapes when viewed normal to plane 32. In some examples, squealer tip 24 may define a substantially flat surface to receive a coating, such an abrasive coating.

In some examples, squealer tip 24 may include a coating applied to squealer tip 24 along the distal end of airfoil 16. The coating may be an abrasive coating, such as a material which exhibits good high temperature strength, oxidation resistance, resistance to wear, and/or a material which limits clearance between a blade tip and a sealing feature in a gas turbine engine. The coating may be a ceramic, ceramic matrix composite, and/or a metallic alloy such as cobalt-, nickel-, or iron-based and may be alloyed with manganese, chromium, silicon, cobalt, tungsten, tantalum, aluminum, titanium, hafnium, rhenium, molybdenum, nickel, iron, boron, vanadium, carbon, yttrium, or the like. The coating may be applied to selective regions of the squealer tip 24, the entire squealer tip 24, and/or any portion of the airfoil 16. The coating may consist of multiple materials or alloys and a system of multiple layers. The coating may be in the shape of the squealer tip 24 when viewed normal to plane 32 defined by the squealer tip 24.

Blade tip 28, first squealer tip rail 25, second squealer tip rail 26, and squealer tip cap 27 define an internal squealer tip cooling channel. In some examples, at least one of first squealer tip rail 25 along pressure sidewall 17 or suction sidewall 19, second squealer tip rail 26 along the pressure sidewall 17 or suction sidewall 19, or first squealer tip rail 25 at trailing edge 20 defines a discharge aperture 30 configured to discharge cooling fluid from the internal squealer tip cooling channel.

Figure 2:
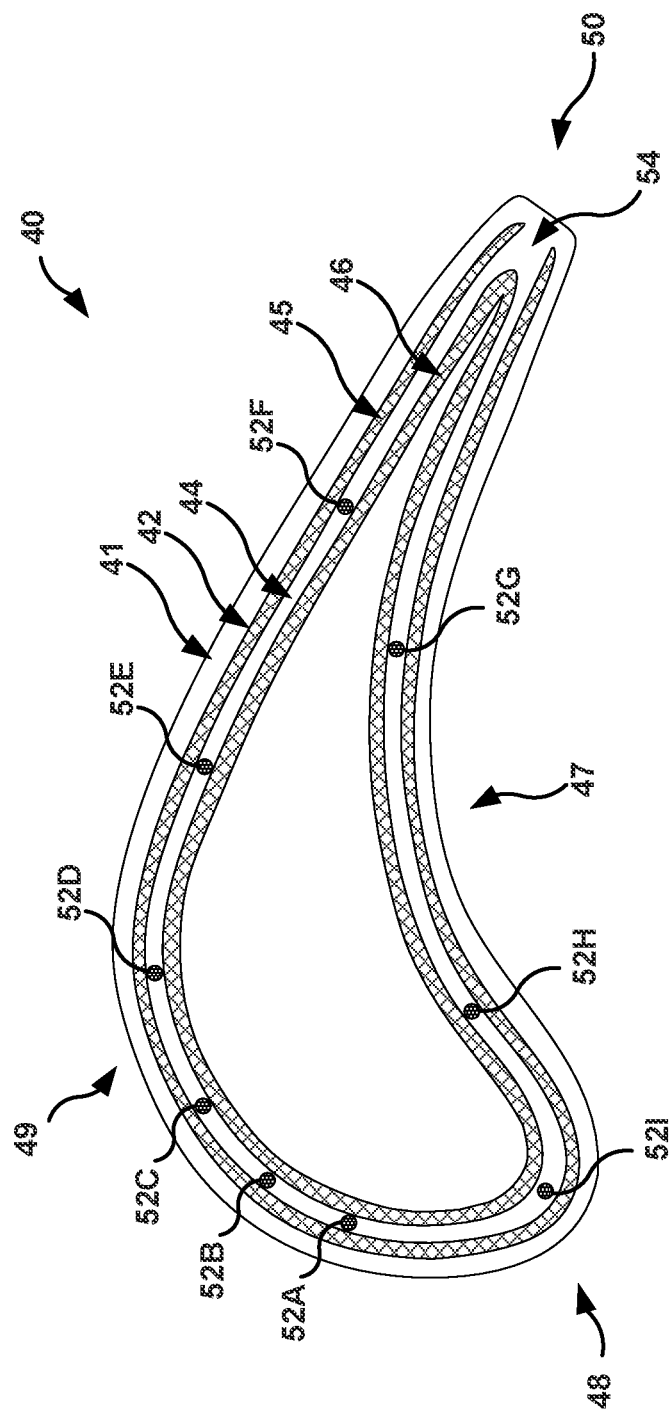
FIG. 2 is conceptual and schematic diagram illustrating a radial cross-sectional view of an example airfoil that includes a squealer tip including an internal squealer tip cooling channel.

Blade tip 28 may define one or more supply apertures that fluidly connect internal cooling circuit 22 and the internal squealer tip cooling channel. FIG. 2 is conceptual and schematic diagram illustrating a radial cross-sectional view (e.g., viewed normal to plane 32) of an example airfoil 40 that includes a squealer tip 42 including an internal squealer tip cooling channel 44. Airfoil 40 may be the same as or substantially similar to airfoil 16 in FIGS. 1A and 1B. For example, airfoil 40 may include pressure sidewall 47 and suction sidewall 49 extending between leading edge 48 and trailing edge 50 opposite leading edge 48. Airfoil 40 also may include an internal cooling circuit (not shown) extending from the base of airfoil 40 to a blade tip 41 of airfoil 40. Airfoil 40 also may include squealer tip 42 on blade tip 41. Squealer tip 42 includes first squealer tip rail 45 and second squealer tip rail 46 adjacent to first squealer tip rail 45. Squealer tip 42 may include a squealer tip cap (not shown) extending between first squealer tip rail 45 and second squealer tip rail 46, e.g., at radial-most surfaces of first squealer tip rail 45 and second squealer tip rail 46.

Blade tip 41, first squealer tip rail 45, second squealer tip rail 46, and the squealer tip cap define internal squealer tip cooling channel 44. Internal squealer tip cooling channel 44 may include any suitable dimensions. In some examples, a width and/or a height of internal squealer tip cooling channel 44 may be between about 0.25 millimeters and about 2.0 millimeters, such as between about 0.5 millimeters and about 1.5 millimeters, and the width and the height may be same or may be different. The dimensions of internal squealer tip cooling channel 44 may affect the amount and/or the rate of heat transfer from the portions of blade tip 41, first squealer tip rail 45, second squealer tip rail 46, and the squealer tip cap defining internal squealer tip cooling channel 44 and a cooling fluid flowing through internal squealer tip cooling channel 44. In this way, the dimensions of internal squealer tip channel 44 may be selected to provide a desired amount and/or rate of heat transfer from the portions of blade tip 41, first squealer tip rail 45, second squealer tip rail 46, and the squealer tip cap defining internal squealer tip cooling channel 44 to the cooling fluid.

Blade tip 41 defines at least one supply aperture extending through blade tip 41 that fluidly connect the internal cooling circuit of airfoil 40 and internal squealer tip cooling channel 44. In some examples, blade tip 41 defines a plurality of supply apertures 52A, 52B, 52C, 52D, 52E, 52F, 52G, 52H, and 52I (collectively, "supply apertures 52") that fluidly connect the internal cooling circuit of airfoil 40 and internal squealer tip cooling channel 44. For example, supply apertures 52 may include respective boreholes through blade tip 41. Supply apertures 52 may be positioned at any desired location within blade tip 41 such that supply apertures 52 open to internal squealer tip cooling channel 44. For example, supply apertures 52 may be positioned to provide substantially uniform cooling fluid flow to squealer tip 42, e.g., to help maintain a substantially uniform temperature of squealer tip 42 below a predetermined threshold temperature.

Supply apertures 52 may define similar or dissimilar shapes having similar or dissimilar areas. In some examples, each supply aperture of supply apertures 52 may define circular shape having a diameter between about 0.25 millimeters and about 2.0 millimeters, such as between about 0.5 millimeters and about 1.5 millimeters. The shape and area of a respective supply aperture of supply apertures 52 may affect cooling fluid flow through the respective supply aperture of supply apertures 52.

In some examples, a pressure drop in the cooling fluid from the internal cooling circuit through supply apertures 52 into internal squealer tip cooling channel 44 may prevent the cooling fluid from reentering the internal cooling circuit from internal squealer tip cooling channel 44. To facilitate flow of a cooling fluid through internal squealer tip cooling channel 44, in some examples, first squealer tip rail 25 at trailing edge 20 defines a discharge aperture 54 configured to discharge cooling fluid from internal squealer tip cooling channel 44. In this way, internal squealer tip cooling channel 44 may be configured to maintain a substantially uniform temperature of squealer tip 42, e.g., to help maintain a substantially uniform temperature of squealer tip 42 below a predetermined threshold temperature.

Additionally or alternatively, at least one of first squealer tip rail 45 along pressure sidewall 47 or suction sidewall 49, second squealer tip rail 46 along the pressure sidewall 47 or suction sidewall 49 may include one or more discharge apertures. FIGS. 3 to 6 are conceptual and schematic diagrams illustrating lateral cross-sectional views of a portion of an example airfoil 60 that include a squealer tip 62 including an internal squealer tip cooling channel 64 and discharge apertures 90 and 92 in first squealer tip rail 74 and second squealer tip rail 76, respectively. Airfoil 60 may be the same as or substantially similar to airfoil 16 in FIGS. 1A and 1B or airfoil 40 in FIG. 2, aside from the differences described herein. For example, airfoil 60 may include suction sidewall 66 and pressure sidewall 68 extending between a leading edge (not shown) and a trailing edge (not shown) opposite the leading edge. Airfoil 60 also may include an internal cooling circuit 70 extending from the base of airfoil 60 to a blade tip 72 of airfoil 60. Airfoil 60 also may include squealer tip 62 on blade tip 72.

Figure 3:
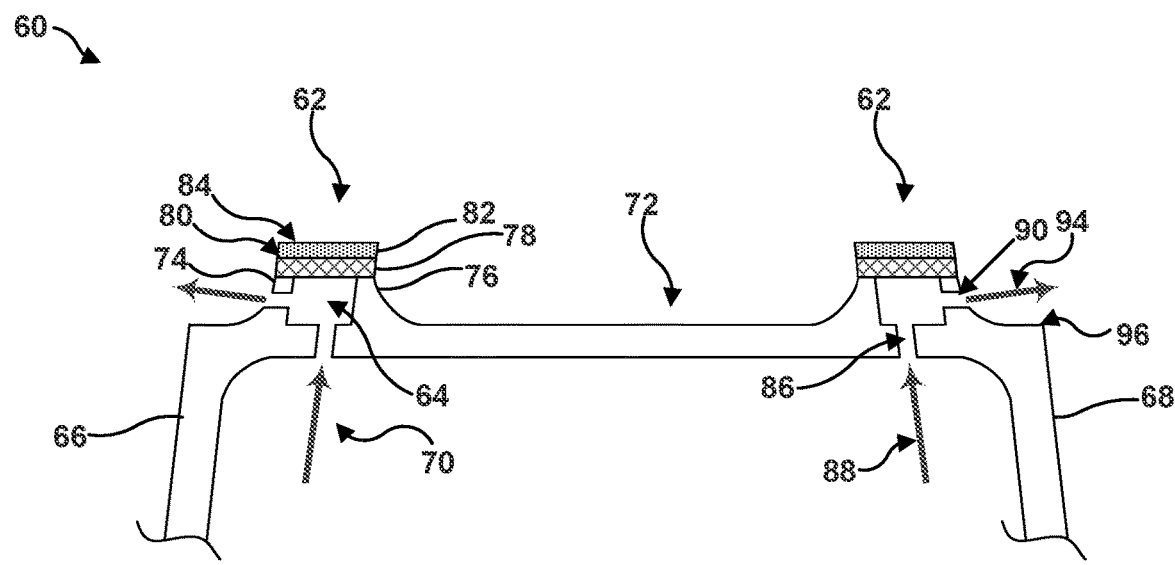
FIGS. 3 to 6 are conceptual and schematic diagrams illustrating lateral cross-sectional views of a portion of an example airfoil that include a squealer tip including an internal squealer tip cooling channel and discharge apertures in a first squealer tip rail or a second squealer tip rail.
Figure 4:
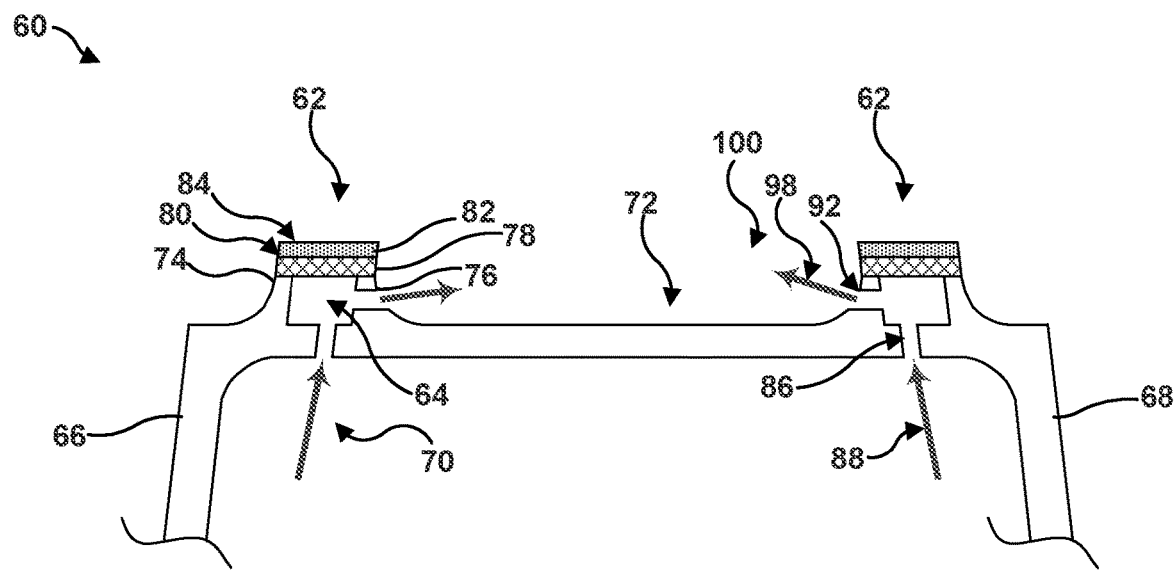
Figure 5:
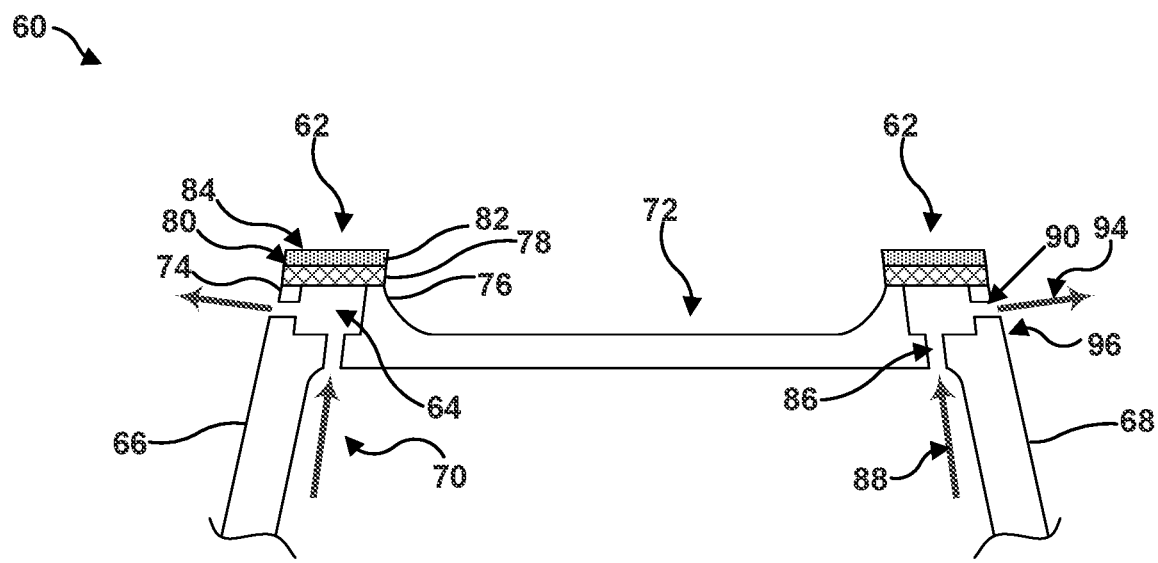
Figure 6:
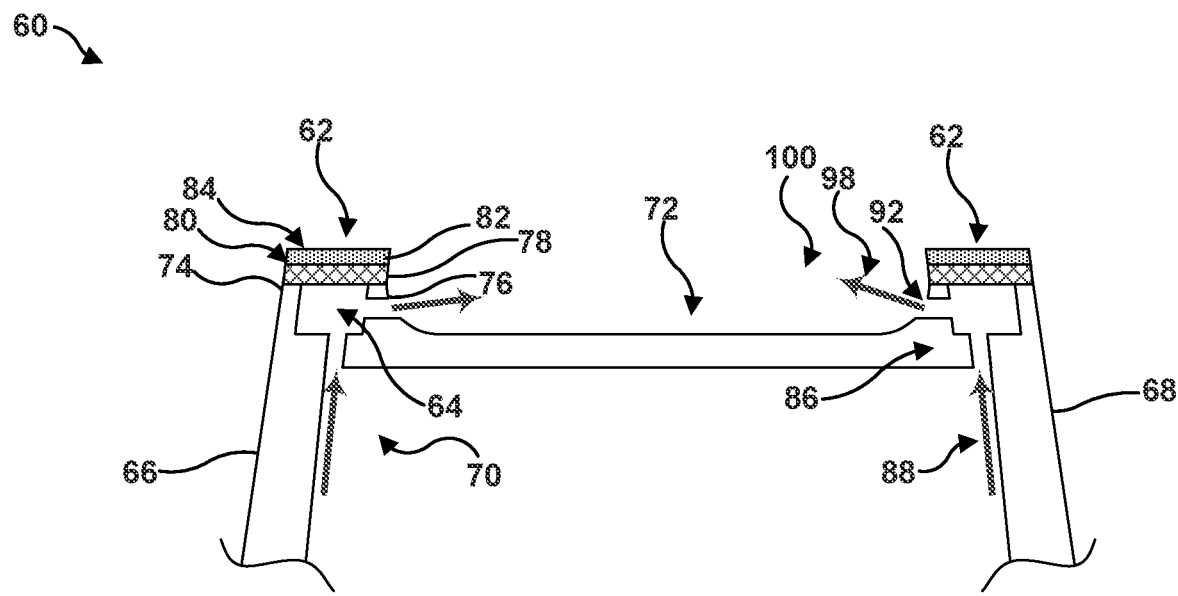

Squealer tip 62 includes first squealer tip rail 74 and second squealer tip rail 76 separated from and adjacent to first squealer tip rail 74. As shown in FIGS. 3 and 4, first squealer tip rail 74 may be set back from both suction sidewall 66 and pressure sidewall 68. In other examples, as shown in FIGS. 5 and 6, first squealer tip rail 74 may be substantially flush with both suction sidewall 66 and pressure sidewall 68. In other examples, first squealer tip rail 74 may set back from one of suction sidewall 66 or pressure sidewall 68 and flush with the other of suction sidewall 66 or pressure sidewall 68.

Squealer tip 62 includes a squealer tip cap 78 extending between first squealer tip rail 74 and second squealer tip rail 76, e.g., at radial-most surfaces of first squealer tip rail 74 and second squealer tip rail 76. In this way, blade tip 72, first squealer tip rail 74, second squealer tip rail 76, and squealer tip cap 78 define internal squealer tip cooling channel 64. In some examples, squealer tip cap 78 defines a substantially flat surface 80 to receive a coating 82, such an abrasive coating. Coating 82 may define a substantially flat surface 84. In examples in which coating 82 includes an abrasive coating, surface 84 may be configured to abrade a channel in an abradable portion of an adjacent static component, e.g., a turbine shroud, as discussed above.

Blade tip 72 defines at least one supply aperture 86 that opens to internal squealer tip cooling channel 64. Supply aperture 86 fluidly connects internal cooling circuit 70 and internal squealer tip cooling channel 64. For example, cooling fluid may be directed from internal cooling circuit 70 along flow path 88 via supply aperture 86 into internal squealer tip cooling channel 64. In this way, squealer tip 62 may be internally cooled to reduce thermal loading on squealer tip 62. Using internal squealer tip cooling channel 64 to cool squealer tip 62 may reduce an amount of cooling fluid used to cool squealer tip 62, e.g., compared to components in which cooling fluid is primarily exhausted from cooling holes formed near blade tip 72 and caused to flow externally over squealer tip 62. Reducing the amount of cooling fluid exhausted from cooling holes formed near the blade tip and caused to flow externally over the squealer tip may also improve aerodynamic efficiency of the component and, ultimately, the gas turbine engine.

As shown in FIGS. 3 to 6, discharge aperture 90 in first squealer tip rail 74 (along suction sidewall 66, pressure sidewall 68, or both), discharge aperture 92 in second squealer tip rail 76 (along suction sidewall 66, pressure sidewall 68, or both), or both discharge cooling fluid from internal squealer tip cooling channel 44 to facilitate flow of a cooling fluid through internal squealer tip cooling channel 64. For example, as shown in FIGS. 3 and 5, discharge aperture 90 in first squealer tip rail 74 along pressure sidewall 68 discharges cooling fluid from internal squealer tip cooling channel 44 along flow path 94 toward external portion 96 of blade tip 72. A discharge aperture is also shown in first squealer tip rail 74 along suction sidewall 66, although this is not labeled for clarity.

As shown in FIGS. 4 and 6, discharge aperture 92 in second squealer tip rail 76 along pressure sidewall 68 discharges cooling fluid from internal squealer tip cooling channel 44 along flow path 98 toward internal portion 100 of blade tip 72. A discharge aperture is also shown in second squealer tip rail 76 along suction sidewall 66, although this is not labeled for clarity. Supply aperture 86 and discharge apertures 90 and 92 are shown in the same plane of the page for illustration purposes, although supply aperture 86 and discharge apertures 90 and 92 may be positioned along any desired portion of blade tip 72 and first squealer tip rail 74 and second squealer tip rail 76, respectively. In this way, internal squealer tip cooling channel 64 may be configured to maintain a substantially uniform temperature of squealer tip 42, e.g., to help maintain a substantially uniform temperature of squealer tip 42 below a predetermined threshold temperature.

Figure 7:
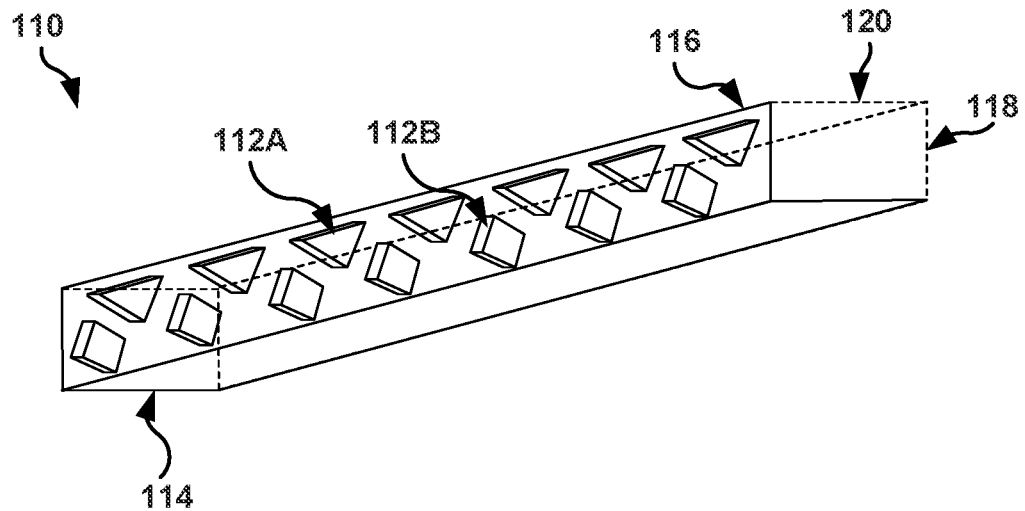
FIG. 7 is a conceptual and schematic diagram illustrating a perspective view of an example internal squealer tip cooling channel including three-dimensional features.

In some examples, additional features may be included in internal squealer tip cooling channel 64 to improve convective heat transfer from squealer tip 62 to cooling fluid inside internal squealer tip cooling channel 64, control cooling fluid flow within internal squealer tip cooling channel 64, or both. FIG. 7 is a conceptual and schematic diagram illustrating a perspective view of an example internal squealer tip cooling channel 110 including three-dimensional features 112A and 112B (collectively, "three-dimensional features 112"). Internal squealer tip cooling channel 110 may be the same as or similar to internal squealer tip cooling channel 44 of FIG. 2 and internal squealer tip cooling channel 64 of FIGS. 3 to 6, aside from the differences described herein. For example, blade tip 114, first squealer tip rail 116, second squealer tip rail 118, and squealer tip cap 120 define internal squealer tip cooling channel 110.

Three-dimensional features 112 may be disposed on one or more of blade tip 114, first squealer tip rail 116, second squealer tip rail 118, and squealer tip cap 120. For purposes of illustration, three-dimensional features 112 are shown only on first squealer tip rail 116. Three-dimensional features 112 may include embossed or engraved features having any suitable geometry and orientation. For example, as shown in FIG. 7, three-dimensional features 112A include embossed triangular shaped features oriented on first squealer tip rail 116 near squealer tip cap 120 and three-dimensional features 112B include embossed quadrilateral shaped features oriented on first squealer tip rail 116 near blade tip 114. In some examples, three-dimensional features 112 may extend only partially into internal squealer tip cooling channel 110, e.g., less than half of the width and/or height of squealer tip cooling channel 110. In other examples, three-dimensional features 112 may extend substantially across internal squealer tip cooling channel 110, e.g., more than half of the width and/or height of squealer tip cooling channel 110. In some examples, respective three-dimensional features of three-dimensional features 112 may extend different respective distances into and/or substantially across internal squealer tip cooling channel 110. Additionally or alternatively, three-dimensional features 112 may extend along all or a portion of the longitudinal length of internal squealer tip cooling channel 112.

In this way, three-dimensional features 112 increase the surface area of internal squealer tip cooling channel 110. The increased surface area may increase convective heat transfer between a cooling fluid flowing through internal squealer tip cooling channel 110 and the respective surface on which three-dimensional features 112 are disposed (e.g., blade tip 114, first squealer tip rail 116, second squealer tip rail 118, squealer tip cap 120, or a combination thereof). Additionally or alternatively, three-dimensional features 112 may increase turbulence of a cooling fluid within internal squealer tip cooling channel 110. The increased turbulence of the cooling fluid may reduce the temperature gradient near a respective surface on which three-dimensional features 112 are disposed (e.g., blade tip 114, first squealer tip rail 116, second squealer tip rail 118, squealer tip cap 120, or a combination thereof) to enable increased convective heat transfer between the cooling fluid through internal squealer tip cooling channel 110 and the respective surface on which three-dimensional features 112 are disposed (e.g., blade tip 114, first squealer tip rail 116, second squealer tip rail 118, squealer tip cap 120, or a combination thereof).

Figure 8:
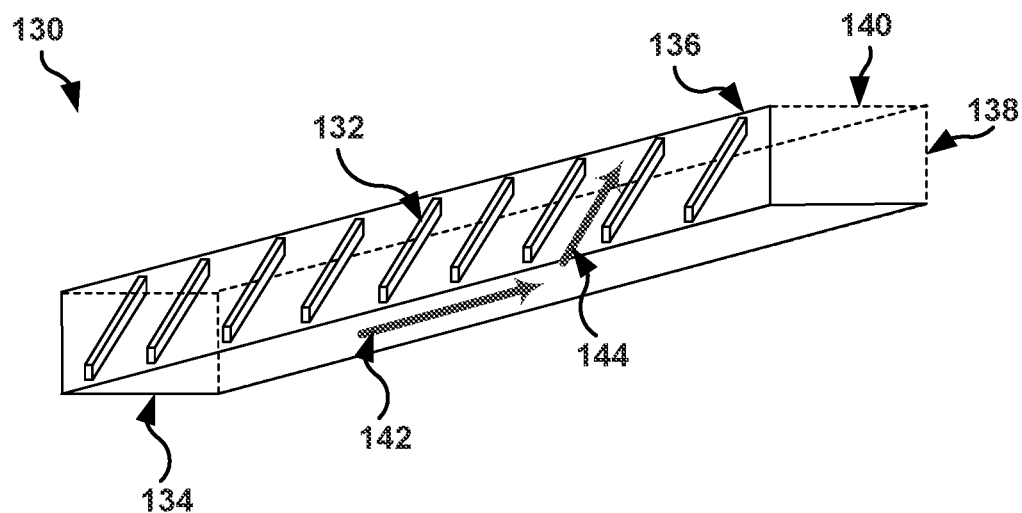
FIG. 8 is a conceptual and schematic diagram illustrating a perspective view of an example internal squealer tip cooling channel including three-dimensional features oriented to affect cooling fluid flow through the internal squealer tip cooling channel.

In some examples, three-dimensional features may be oriented to affect cooling fluid flow through an internal squealer tip cooling channel. FIG. 8 is a conceptual and schematic diagram illustrating a perspective view of an example internal squealer tip cooling channel 130 including three-dimensional features 132 oriented to affect (e.g., control) cooling fluid flow through internal squealer tip cooling channel 130. Internal squealer tip cooling channel 130 may be the same as or similar to internal squealer tip cooling channel 44 of FIG. 2, internal squealer tip cooling channel 64 of FIGS. 3 to 6, and internal squealer tip cooling channel 110 of FIG. 7, aside from differences described herein. For example, blade tip 134, first squealer tip rail 136, second squealer tip rail 138, and squealer tip cap 140 define internal squealer tip cooling channel 130. Also, internal squealer tip cooling channel 130 includes three-dimensional features 132 disposed on one or more of blade tip 134, first squealer tip rail 136, second squealer tip rail 138, and squealer tip cap 140 define internal squealer tip cooling channel 130.

As shown in FIG. 8, three-dimensional features 132 include engraved quadrilateral-shaped features. For purposes of illustration, three-dimensional features 132 are shown only on first squealer tip rail 136. Three-dimensional features 132 may be oriented to at least partially control a flow of cooling fluid through internal squealer tip cooling channel 130. For example, bulk flow 142 of cooling fluid generally travels in a direction normal to the cross section of internal squealer tip cooling channel 130 (e.g., bulk flow 142 generally travels along the longitudinal axis of internal squealer tip cooling channel 130). At least a portion 144 of cooling fluid, e.g., near three-dimensional features 132, may travel in a direction substantially parallel to three-dimensional features 132. In some examples, three-dimensional features 132 may be oriented to improve mixing of the cooling fluid along the longitudinal direction of internal squealer tip cooling channel 130, to produce separation and reattachment of the thermal boundary layer between internal squealer tip cooling channel 130 and the cooling fluid to increase convective heat transfer, or both. In this way, three-dimensional features 132 may at least partially affect a flow of cooling fluid through internal squealer tip cooling channel 130 to reduce thermal loading on one or more portions of a squealer tip.

Figure 9:
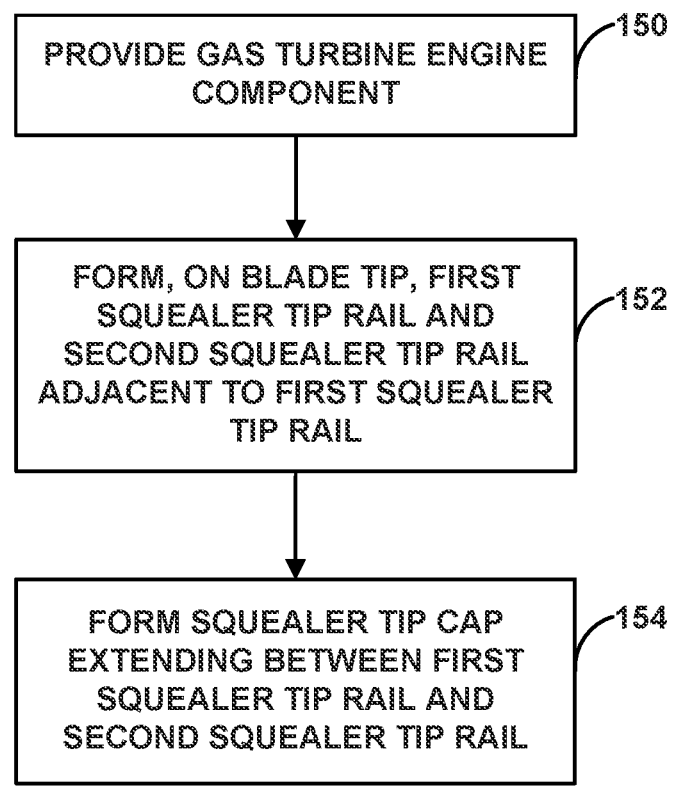
FIG. 9 is a flow diagram illustrating an example technique for forming a squealer tip including an internal squealer tip cooling channel.

The squealer tips including an internal squealer tip cooling channel described herein may be formed using a variety of techniques, such as brazing, direct energy deposition, machining, welding, or the like. FIG. 9 is a flow diagram illustrating an example technique for forming a squealer tip including an internal squealer tip cooling channel. The technique illustrated in FIG. 9 will be described with respect to gas turbine engine blade 10 of FIGS. 1A and 1B, airfoil 40 of FIG. 2, and airfoil 60 of FIGS. 3 to 6, although one of ordinary skill in the art will appreciate that similar technique may be used to form other gas turbine engine components that include a squealer tip having an internal squealer tip cooling channel.

The technique illustrated in FIG. 9 includes providing a gas turbine engine component 10 that includes an airfoil 16 extending radially from a base (e.g., platform 14) to a blade tip 28 (150). Airfoil 16 includes a pressure sidewall 17 and a suction sidewall 19 each extending between a leading edge 18 and a trailing edge 20 opposite leading edge 18, and an internal cooling circuit 22 extending from base 14 to blade tip 28. In some examples, as discussed above, gas turbine engine component 10 may include a blisk that includes an integrally formed blade and disk. The technique illustrated in FIG. 9 may optionally include fabricating gas turbine engine component 10 or repairing of gas turbine engine component 10.

The technique illustrated in FIG. 9 also includes forming, on blade tip 28, a first squealer tip rail 25 and a second squealer tip rail 26 adjacent to first squealer tip rail 25 (152). In some examples, first squealer tip rail 25 and second squealer tip rail 26 may be integrally formed with blade tip 28. For example, first squealer tip rail 25 and second squealer tip rail 26 may be machined into blade tip 28, deposited onto blade tip 28 (e.g., by direct energy deposition or other additive manufacturing technique), or a combination of both machining and deposition.

In other examples, first squealer tip rail 25 and second squealer tip rail 26 are integrally formed with squealer tip cap 27 and joined to blade tip 28. For example, a presintered preform defining first squealer tip rail 25, second squealer tip rail 26, and squealer tip cap 27 may be brazed to blade tip 28.

Blade tip 28 defines at least one supply aperture 52 that fluidly connect internal cooling circuit 22 and internal squealer tip cooling channel 44. For example, the technique illustrated in FIG. 9 optionally includes, before or after forming a first squealer tip rail 25 and a second squealer tip rail 26, forming in blade tip 28 one or more supply apertures 52 that fluidly connect internal cooling circuit 22 and internal squealer tip cooling channel 44. For example, supply apertures 52 may be formed in blade tip 28 by machine drilling, laser drilling, chemical etching, or the like. In some examples, the technique of FIG. 9 may include shaping a respective supply aperture of supply apertures 52, e.g., during a drilling process, to improve fluid dynamics of the respective supply aperture of supply apertures 52.

In some examples, internal squealer tip cooling channel (e.g., blade tip 28, first squealer tip rail 25, second squealer tip rail 26, and squealer tip cap 27) may include three-dimensional features (e.g., three-dimensional features 112 or 132) to improve convective heat transfer from squealer tip 24 to cooling fluid inside internal squealer tip cooling channel 44, control cooling fluid flow within internal squealer tip cooling channel 44, or both. For example, the technique illustrated in FIG. 9 optionally includes, before or after forming first squealer tip rail 25 and second squealer tip rail 26, forming three-dimensional features 112 in at least a portion of blade tip 28, first squealer tip rail 25, second squealer tip rail 26, or a combination thereof. Forming three-dimensional features 112 may include any suitable technique, such as, for example, machining, laser etching, chemical etching, or the like. In some examples, a presintered preform defining first squealer tip rail 25, second squealer tip rail 26, squealer tip cap 27, or a combination thereof may include three-dimensional features 112.

The technique illustrated in FIG. 9 also includes forming a squealer tip cap 27 extending between first squealer tip rail 25 and second squealer tip rail 26 (154). Forming squealer tip cap 27 extending between first squealer tip rail 25 and second squealer tip rail 26 may include brazing a brazing material defining squealer tip cap 27, using directed energy deposition to deposit a molten metallic material to define squealer tip cap 27, or welding a molten metal material to define squealer tip cap 27. Forming squealer tip cap 27 extending between first squealer tip rail 25 and second squealer tip rail 26 may be performed before or after forming, on blade tip 28, a first squealer tip rail 25 and a second squealer tip rail 26 adjacent to first squealer tip rail 25 (152).

In some examples, a filler material may be used to help maintain the shape of first squealer tip rail 25, second squealer tip rail 26, and/or squealer tip cap 27 while forming squealer tip cap 27 by, for example, brazing, direct energy deposition, or welding. For example, the technique illustrated in FIG. 9 optionally includes, before forming squealer tip cap 27, disposing a filler material between first squealer tip rail 25 and second squealer tip rail 26. The filler material may include a high melting temperature refractive material that does not react with adjacent portions of first squealer tip rail 25 and second squealer tip rail 26. For example, the high melting temperature refractive material may have a melting temperature greater than the temperature at which the braze material is heated to join the braze material to first squealer tip rail 25 and second squealer tip rail 26. For example, the filler material may include an oxide, such as yttrium oxide, aluminum oxide, or the like, mixed with a binder. The binder may include, for example, a water- or alcohol-based binder. In some examples, the filler material that includes an oxide and a binder may be in the form of a tape, a preform, a rope, a powder, or the like. In other examples, the filler material may include a refractory metal, such as molybdenum; or the like. The refractory metal may be in the form of a sheet or other preform. In some examples, the tape, preform, or rope may be shaped to define the outer surface of the filler material substantially aligned with the radial-most surface of first squealer tip rail 25 and second squealer tip rail 26 and, if applicable, to help define a shape of any portions of internal squealer tip cooling channel 44.

In some examples, forming a squealer tip cap 27 may include brazing a brazing material (e.g., a brazing powder, a brazing paste, a wide gap braze composition, or a presintered preform) defining squealer tip cap 27 onto first squealer tip rail 25 and second squealer tip rail 26. In examples in which a filler material is disposed between squealer tip rail 25 and second squealer tip rail 26, the braze material may be applied to the surface of the filler material and the radial-most surface of first squealer tip rail 25 and second squealer tip rail 26. In this way, the filler material may reduce intrusion of the braze material into the internal squealer tip cooling channel 44 during brazing.

Regardless of the braze material used, brazing the braze material to first squealer tip rail 25 and second squealer tip rail 26 may include heating at least the braze material to cause the braze material to join to first squealer tip rail 25 and second squealer tip rail 26. For example, at least the braze material may be heated to a temperature between about 1,500° F. (about 815° C.) and about 2,400° F. (about 1315° C.) to cause the braze material to join to first squealer tip rail 25 and second squealer tip rail 26. In some examples, induction heating may be used to substantially localize heat to the braze material to reduce dimensional nonconformance of blade 16, which may occur if all blade 16 is heated during the brazing technique. In some examples, first squealer tip rail 25 and second squealer tip rail 26 and the braze material may be enclosed and heated within the vacuum furnace, which may result in substantial temperature uniformity within first squealer tip rail 25, second squealer tip rail 26, and the braze material to reduce residual stresses at the interface of the braze material with both first squealer tip rail 25 and second squealer tip rail 26. In some examples, the braze material may roughly define the shape of squealer tip cap 27 and forming squealer tip cap 27 may include, after heating the braze material to join the braze material to first squealer tip rail 25 and second squealer tip rail 26, machining excess braze material to form squealer tip cap 27.

In some examples, forming a squealer tip cap 27 includes depositing, by directed energy deposition, a molten metallic powder onto first squealer tip rail 25 and second squealer tip rail 26. For example, a metallic powder feedstock may be deposited as a powder bed creating a layer of powder or at predetermined locations (e.g., along a filler material, first squealer tip rail 25, and second squealer tip rail 26). The metallic powder feedstock may include nickel-based superalloys, cobalt-based superalloys, or any suitable combination of superalloys. Alternatively, the metallic powder feedstock may be deposited using blown powder directed energy deposition. Blown powder directed energy deposition may use a laser to melt blown powder into first squealer tip rail 25 and second squealer tip rail 26 by blowing the metallic powder feedstock into a melt pool created by the laser. In examples in which a filler material is disposed between squealer tip rail 25 and second squealer tip rail 26, a molten metallic powder may be applied by direct energy deposition to the surface of the filler material and the radial-most surface of first squealer tip rail 25 and second squealer tip rail 26. In this way, the filler material may reduce intrusion of the molten metallic material into the internal squealer tip cooling channel 44 during direct energy deposition.

In some examples, forming a squealer tip cap 27 includes welding material onto first squealer tip rail 25 and second squealer tip rail 26. For example, welding material onto first squealer tip rail 25 and second squealer tip rail 26 may include progressively adding material by any suitable welding technique to first squealer tip rail 25 and/or second squealer tip rail 26 to form squealer tip cap 27. In examples in which a filler material is disposed between squealer tip rail 25 and second squealer tip rail 26, a molten metallic material may be applied by any suitable welding technique to the surface of the filler material and the radial-most surface of first squealer tip rail 25 and second squealer tip rail 26. In this way, the filler material may reduce intrusion of the molten metallic material into the internal squealer tip cooling channel 44 during welding.

In some examples, forming first squealer tip rail 25 and second squealer tip rail 26 and forming squealer tip cap 27 includes brazing, as discussed above, a presintered preform defining first squealer tip rail 25, second squealer tip rail 26, and squealer tip cap 27 onto the blade tip 28. In this way, first squealer tip rail 25 and second squealer tip rail 26 may be formed integrally with squealer tip cap 27 by brazing.

In examples in which a filler material is disposed between first squealer tip rail 25 and second squealer tip rail 26, the technique optionally includes removing filler material. For example, squealer tip 24 may be heated to heat filler material in examples in which filler material includes a refractory oxide and a binder. Filler material may be heated to a temperature sufficient to burn the binder, creating a powder including the burned binder and the refractive oxide. This powder then may be removed, e.g., by flowing a pressurized fluid through internal squealer tip cooling channel 44. In other examples, such as examples in which filler material includes a refractory metal, a chemical etching technique may be used to remove filler material. The etchant may be selected to react with the refractory metal while not reacting with blade tip 28, first squealer tip rail 25, second squealer tip rail 26, or squealer tip cap 27. In some examples, a combination of techniques may be used to remove the filler material.

The technique illustrated in FIG. 9 optionally includes, after forming squealer tip cap 27, applying an abrasive coating 82 to a surface 80 of squealer tip cap 27. Any suitable method may be used to apply abrasive coating 82, such as, for example, thermal spraying, e.g., air plasma spraying, high velocity oxy-fuel (HVOF) spraying, low pressure plasma spraying; physical vapor deposition (PVD), e.g., electron beam physical vapor deposition (EB-PVD), directed vapor deposition (DVD), cathodic arc deposition; chemical vapor deposition (CVD); slurry process deposition; sol-gel process deposition; electrophoretic deposition; or the like.

The following clauses include example subject matter of the present disclosure.

Clause 1. A gas turbine engine component comprising: an airfoil extending radially from a base to a blade tip, the airfoil comprising: a pressure sidewall and a suction sidewall each extending between a leading edge and a trailing edge opposite the leading edge; and an internal cooling circuit extending from the base to the blade tip; and a squealer tip comprising: a first squealer tip rail and a second squealer tip rail adjacent to the first squealer tip rail; and a squealer tip cap extending between the first and second squealer tip rails, wherein the blade tip, the first and second squealer tip rails, and the squealer tip cap define an internal squealer tip cooling channel, and wherein the blade tip defines a supply aperture that fluidly connect the internal cooling circuit and the internal squealer tip cooling channel.

Clause 2. The gas turbine engine blade of clause 1, wherein the first and second squealer tip rails are integrally formed with the blade tip and joined to the squealer tip cap.

Clause 3. The gas turbine engine blade of clause 1, wherein the first and second squealer tip rails are integrally formed with the squealer tip cap and joined to the blade tip.

Clause 4. The gas turbine engine blade of any one of clauses 1 through 3, wherein the first and second squealer tip rails are set back from the pressure and suction sidewalls.

Clause 5. The gas turbine engine blade of any one of clauses 1 through 4, wherein a width of the internal squealer tip cooling channel is between about 0.25 millimeters and about 2.0 millimeters Clause 6. The gas turbine engine blade of any one of clauses 1 through 5, wherein the first and second squealer tip rails are substantially parallel to each other.

Clause 7. The gas turbine engine blade of any one of clauses 1 through 6, wherein the blade tip defines a plurality of supply apertures extending through the blade tip that fluidly connect the internal squealer tip cooling channel and the internal cooling circuit.

Clause 8. The gas turbine engine blade of clause 7, wherein each aperture of the plurality of supply apertures defines a diameter of between about 0.25 millimeters and about 2.0 millimeters.

Clause 9. The gas turbine engine blade of any one of clauses 1 through 8, wherein a surface of at least one of the blade tip, the first squealer tip rail, the second squealer tip rail, or the squealer tip cap comprises three-dimensional features, wherein the three-dimensional features are configured to increase convective heat transfer between a cooling fluid and the at least one of the blade tip, the first squealer tip rail, the second squealer tip rail, or the squealer tip cap.

Clause 10. The gas turbine engine blade of any one of clauses 1 through 9, wherein the at least one of the first squealer tip rail along the pressure sidewall or the suction sidewall, the second squealer tip rail along the pressure sidewall or the suction sidewall, or the first squealer tip rail at the trailing edge defines a discharge aperture configured to discharge cooling fluid from the internal squealer tip cooling channel.

Clause 11. The gas turbine engine blade of any one of clauses 1 through 10, wherein the airfoil further comprises an abrasive coating on a radial surface of the squealer tip cap.

Clause 12. A method of forming a gas turbine engine component that includes an airfoil extending radially from a base to a blade tip, the airfoil including a pressure sidewall and a suction sidewall each extending between a leading edge and a trailing edge opposite the leading edge, and an internal cooling circuit extending from the base to the blade tip, the method comprising: forming, on the blade tip, a first squealer tip rail and a second squealer tip rail adjacent to the first squealer tip rail; forming a squealer tip cap extending between the first and second squealer tip rails, wherein the blade tip, the first and second squealer tip rails, and the squealer tip cap define an internal squealer tip cooling channel, and wherein the blade tip defines a supply aperture that fluidly connect the internal cooling circuit and the internal squealer tip cooling channel.

Clause 13. The method of clause 12, wherein forming the first and second squealer tip rails comprises machining material from the blade tip or direct energy deposition of material onto the blade tip.

Clause 14. The method of clause 12 or 13, wherein forming the squealer tip cap comprises brazing a presintered preform defining the squealer tip cap onto the first and second squealer tip rails.

Clause 15. The method of clause 12, wherein forming the first and second squealer tip rails and forming the squealer tip cap comprise brazing a presintered preform defining the first and second squealer tip rails and squealer tip cap onto the blade tip.

Clause 16. The method of clause 12, further comprising, before forming the squealer tip cap, disposing a filler material between the first and second squealer tip rails.

Clause 17. The method of clause 16, wherein forming the squealer tip cap comprises brazing a wide gap braze composition onto the first and second squealer tip rails.

Clause 18. The method of clause 16, wherein forming the squealer tip cap comprises depositing, by directed energy deposition, a molten metallic powder onto the first and second squealer tip rails.

Clause 19. The method of clause 16, wherein forming the squealer tip cap comprises welding material onto the first and second squealer tip rails.

Clause 20. The method of any one of clauses 1 through 19, further comprising applying an abrasive coating to a surface of the squealer tip cap.

Various examples have been described. These and other examples are within the scope of the following claims.

What is claimed is:

1. A method of forming a gas turbine engine component, the method comprising:
providing an airfoil extending radially from a base to a blade tip, wherein the airfoil comprises:

a pressure sidewall and a suction sidewall each extending between a leading edge and a trailing edge opposite the leading edge; and an internal cooling circuit extending from the base to the blade tip;

forming a presintered preform comprising:

a first squealer tip rail;

a second squealer tip rail adjacent to the first squealer tip rail; and a squealer tip cap extending between the first and second squealer tip rails;

disposing, before brazing the presintered preform to the blade tip, a filler material between the first and second squealer tip rails; and brazing the presintered preform to the blade tip, wherein the blade tip, the first and second squealer tip rails, and the squealer tip cap define an internal squealer tip cooling channel, and wherein the blade tip defines a supply aperture that fluidly connects the internal cooling circuit and the internal squealer tip cooling channel.

2. The method of claim 1, wherein the method further comprises machining material from the blade tip.

3. The method of claim 1, wherein the method further comprises forming the supply aperture in the blade tip.

4. The method of claim 1, wherein the presintered preform comprises a wide gap braze composition.

5. The method of claim 1, wherein the presintered preform comprises particles of an abrasive.

6. The method of claim 1, wherein the method further comprises forming in at least a portion of the blade tip one or more three-dimensional features, wherein the one or more three-dimensional features are configured to increase a convective heat transfer from the blade tip to a cooling fluid inside the internal squealer tip cooling channel.

7. The method of claim 1, wherein forming the presintered preform further comprises forming in at least a portion of at least one of the first squealer tip rail or the second squealer tip rail one or more three-dimensional features, wherein the one or more three-dimensional features are configured to increase a convective heat transfer from the at least one of the first squealer tip rail or the second squealer tip rail to a cooling fluid inside the internal squealer tip cooling channel.

8. The method of claim 1, wherein filler material comprises at least one of a metal oxide, yttrium oxide, or aluminium oxide and a binder.

9. The method of claim 1, wherein the filler material comprises at least one of a refractor metal or molybdenum.

10. The method of claim 1, further comprising removing, by at least one of heating or chemical etching, the filler material.

11. The method of claim 1, wherein brazing the presintered preform to the blade tip further comprises induction heating of at least a portion of the presintered preform.

12. The method of claim 1, wherein brazing the presintered preform to the blade tip further comprises heating within a vacuum furnace at least the blade tip and the presintered preform.

13. The method of claim 1, wherein the method further comprises, after brazing the presintered preform to the blade tip, machining excess material from at least one of first squealer tip rail, the second squealer tip rail, or the squealer tip cap.

14. The method of claim 1, wherein the method further comprises applying an abrasive coating to a surface of the squealer tip cap.

15. A method of forming a gas turbine engine component, the method comprising:

providing an airfoil extending in a radial direction from a base to a blade tip, wherein the airfoil comprises:

a pressure sidewall and a suction sidewall each extending between a leading edge and a trailing edge opposite the leading edge; and an internal cooling circuit extending from the base to the blade tip;

forming a presintered preform comprising:

a first squealer tip rail;

a second squealer tip rail adjacent to the first squealer tip rail; and a squealer tip cap extending between the first and second squealer tip rails, the squealer tip cap being further in the radial direction from the blade tip than the first squealer tip rail and the second squealer tip rail; and brazing the presintered preform to the blade tip, wherein the blade tip, the first and second squealer tip rails, and the squealer tip cap define an internal squealer tip cooling channel, wherein, after brazing the presintered preform to the blade tip, the blade tip defines a supply aperture that fluidly connects the internal cooling circuit and the internal squealer tip cooling channel, and wherein at least one of the first squealer tip rail or the second squealer tip rail includes a discharge aperture defining a discharge flow path from the internal squealer tip cooling channel to an environment external to the airfoil and the presintered preform.

16. The method of claim 15, further comprising applying an abrasive coating to an outmost surface in the radial direction of the squealer tip cap.

17. The method of claim 15, wherein the internal cooling circuit of the airfoil is fluidically connected to the discharge aperture via the internal squealer tip cooling channel such that a fluid within the internal cooling circuit of the airfoil flows out of the discharge aperture via the internal squealer tip cooling channel to the environment external to the airfoil and the presintered preform.

18. The method of claim 15, wherein, after brazing the presintered preform to the blade tip, the squealer tip cap defines an outermost surface in the radial direction from the base of the gas turbine engine component.

19. The method of claim 15, further comprising machining material from the blade tip.

20. The method of claim 15, further comprising forming the supply aperture in the blade tip.

* * * * *